US009790998B2

(12) United States Patent
Kramm et al.

(10) Patent No.: US 9,790,998 B2
(45) Date of Patent: Oct. 17, 2017

(54) DUAL-CLUTCH ASSEMBLY FOR A DUAL-CLUTCH TRANSMISSION

(71) Applicant: GETRAG Getriebe- und Zahnradfabrik Hermann Hagenmeyer GmbH & Cie KG, Untergruppenbach (DE)

(72) Inventors: Torsten Kramm, Ilsfeld (DE); Hansi Gremplini, Ingersheim (DE); Thomas Wolf, Ludwigsburg (DE)

(73) Assignee: GETRAG Getriebe-und Zahnradfabrik Hermann Hagei, Untergruppenbach (DE)

( * ) Notice: Subject to any disclaimer, the term of this patent is extended or adjusted under 35 U.S.C. 154(b) by 50 days.

(21) Appl. No.: 14/689,669

(22) Filed: Apr. 17, 2015

(65) Prior Publication Data

US 2015/0219167 A1  Aug. 6, 2015

Related U.S. Application Data

(63) Continuation of application No. PCT/EP2013/071384, filed on Oct. 14, 2013.

(30) Foreign Application Priority Data

Oct. 19, 2012 (DE) .......... 10 2012 021 074
Aug. 29, 2013 (DE) .......... 10 2013 109 366

(51) Int. Cl.
*F16D 25/10* (2006.01)
*B60K 6/387* (2007.10)
(Continued)

(52) U.S. Cl.
CPC ............. *F16D 25/10* (2013.01); *B60K 6/387* (2013.01); *B60K 6/442* (2013.01); *B60K 6/48* (2013.01);
(Continued)

(58) Field of Classification Search
CPC ...... F16D 25/10; F16D 25/0638; B60K 6/387
See application file for complete search history.

(56) References Cited

U.S. PATENT DOCUMENTS 7,287,634 B2  10/2007  Agner
7,484,607 B2   2/2009  Schneider
(Continued)

FOREIGN PATENT DOCUMENTS

CN       1637310 A      7/2005
CN     101029663        9/2007
(Continued)

OTHER PUBLICATIONS

English Translation of International Search Report dated Apr. 30, 2015, 12 pages.
(Continued)

*Primary Examiner* — Jacob S Scott
*Assistant Examiner* — Tinh Dang
(74) *Attorney, Agent, or Firm* — Reising Ethington P.C.

(57) ABSTRACT

A dual-clutch assembly for a dual-clutch transmission has an input shaft, a first friction clutch, a second friction clutch, a first output shaft, a second output shaft, a first piston/cylinder assembly, and a second piston/cylinder assembly. Input elements of the friction clutches are connected to the input shaft. Output elements of the friction clutches are each connected to one of the two output shafts. The friction clutches can each be actuated by means of one of the piston/cylinder assemblies. Each piston/cylinder assembly has a piston, which is supported so as to be axially movable in relation to an associated cylinder. Each cylinder is supported on a support on the side facing away from the piston in a region lying radially outside. Each cylinder is spaced apart from the support on the side facing away from the piston in a region lying radially inside.

9 Claims, 3 Drawing Sheets

(51) Int. Cl.

| | | |
|---|---|---|
| *F16D 21/06* | (2006.01) | |
| *F16D 25/0638* | (2006.01) | |
| *B60K 6/442* | (2007.10) | |
| *B60K 6/50* | (2007.10) | |
| *B60K 6/48* | (2007.10) | |
| *B60K 6/547* | (2007.10) | |

(52) U.S. Cl.
CPC ............. *B60K 6/50* (2013.01); *B60K 6/547* (2013.01); *F16D 21/06* (2013.01); *F16D 25/0638* (2013.01); *B60K 2006/4825* (2013.01); *F16D 2021/0607* (2013.01); *F16D 2021/0661* (2013.01); *F16D 2300/08* (2013.01); *Y02T 10/6221* (2013.01); *Y02T 10/6252* (2013.01); *Y10S 903/914* (2013.01); *Y10S 903/915* (2013.01)

(56) References Cited

U.S. PATENT DOCUMENTS

| | | | | |
|---|---|---|---|---|
| 7,648,012 | B2 * | 1/2010 | Gremplini | ............... F16D 21/06 192/106 F |
| 7,712,594 | B2 | 5/2010 | Gremplini | |
| 8,322,503 | B2 * | 12/2012 | Combes | ................... B60K 6/26 180/65.25 |
| 8,376,649 | B2 * | 2/2013 | Heinrich | ............... F16D 1/0858 403/359.4 |
| 8,453,816 | B2 | 6/2013 | McCrary | |
| 8,997,961 | B2 | 4/2015 | Absenger | |
| 2005/0087420 | A1 * | 4/2005 | Schafer | ................... F16D 21/06 192/55.61 |
| 2006/0196751 | A1 | 9/2006 | Schneider | |
| 2008/0236983 | A1 | 10/2008 | Kummer | |
| 2009/0084652 | A1 * | 4/2009 | Kummer | ............... F16D 13/683 192/113.1 |
| 2013/0153355 | A1 | 6/2013 | Kummer et al. | |

FOREIGN PATENT DOCUMENTS

| | | |
|---|---|---|
| DE | 102006010113 A1 | 9/2007 |
| DE | 102007027121 A1 | 12/2008 |
| DE | 102007050235 A1 | 4/2009 |
| DE | 102008055681 A1 | 5/2010 |
| DE | 102009039223 | 5/2011 |
| DE | 102009050998 | 5/2011 |
| DE | 102012112408 A1 | 6/2013 |
| EP | 1698799 | 9/2006 |
| EP | 2685122 | 1/2014 |
| WO | 2008033701 A1 | 3/2008 |

OTHER PUBLICATIONS

Chinese Office Action for Application No. 201380054184.3 dated Aug. 2, 2016, 6 pages.
English Translation of Chinese Office Action for Application No. 201380054184.3 dated Aug. 2, 2016, 9 pages.
International Search Report dated Mar. 7, 2014, 11 pages.
German Search Report dated Oct. 18, 2013, 4 pages.

* cited by examiner

DUAL-CLUTCH ASSEMBLY FOR A DUAL-CLUTCH TRANSMISSION

CROSS REFERENCES TO RELATED APPLICATIONS

This is a Continuation application of International patent application PCT/EP 2013/071384, filed on Oct. 14, 2013, which claims priority to German patent application DE 10 2012 021 074.4, filed on Oct. 19, 2012 and German patent application DE 10 2013 109 366.3, filed on Aug. 29, 2013, the content of which documents are incorporated by reference.

BACKGROUND

The present invention relates to a dual-clutch assembly for a dual-clutch transmission, having an input shaft, a first friction clutch, a second friction clutch, a first output shaft, a second output shaft, a first piston/cylinder assembly, and a second piston/cylinder assembly; wherein input elements of the friction clutches are connected to the input shaft; wherein output elements of the friction clutches are each connected to one of the two output shafts; wherein the friction clutches can each be actuated by means of one of the piston/cylinder assemblies; and wherein each piston/cylinder assembly has a piston, which is supported so as to be axially movable in an associated cylinder. A dual-clutch assembly of this kind is known from DE102008055681A1.

Dual-clutch transmissions have a dual-clutch assembly and two transmission sections. The transmission sections are generally of countershaft construction. A gear change without an interruption in the tractive effort can be performed by overlapping actuation of the two clutches of the dual-clutch assembly. This type of dual-clutch transmission is suitable for motor vehicles, especially for passenger motor vehicles.

In dual-clutch assemblies, use is nowadays generally made of fluid-operated friction clutches, e.g. wet multiplate clutches. DE102008055681A1 shows a dual-clutch assembly in which a piston/cylinder assembly is assigned to each of the two friction clutches, which are nested radially one inside the other. A first friction clutch is arranged radially inside and a second friction clutch is arranged radially outside. Fluid is supplied to the piston/cylinder assemblies via rotary unions between a hub fixed to the housing and the hub shell, which is mounted rotatably on the hub. The piston/cylinder assemblies are fixed to the hub shell. Each piston/cylinder assembly has a piston and a cylinder, wherein the piston is mounted so as to be axially movable in the associated cylinder and the piston and cylinder surround a piston chamber in a pressure tight manner. Each piston chamber can be pressurized by means of fluid. When fluid is supplied to a piston chamber, the piston therein is pressed axially against plate packs of the associated friction clutch, and the friction clutch is closed owing to frictional engagement. The pressure in the piston chamber is 10 bar and above, while the axial contact pressure force of the pistons on the plate packs is 5 kN and above.

The disadvantage with this type of dual-clutch assembly is the fact that the high contact pressure forces of the pistons on the plate packs lead to high reaction forces on the cylinders, with the result that the cylinders are of correspondingly massive construction, something that requires installation space and gives rise to costs for materials.

As a solution, DE102006010113A1 shows a dual-clutch assembly having piston/cylinder assemblies fixed to a hub and having pistons which are mounted so as to be axially movable in the associated cylinder. On the side facing away from the piston, the cylinder is supported by means of a retaining ring of the hub fixed to the housing, in order in this way to absorb the reaction forces with minimum installation space and low costs for materials.

It has proven disadvantageous with this type of dual-clutch assembly that the sealing material of the cylinder can chafe on the retaining ring of the hub fixed to the housing and can thus wear.

SUMMARY

It is therefore an object of the present application to improve these dual-clutch assemblies for a dual-clutch transmission.

According to an aspect of the invention, the object is achieved by a dual-clutch assembly for a dual-clutch transmission, having an input shaft, a first friction clutch, a second friction clutch, a first output shaft, a second output shaft, a first piston/cylinder assembly, and a second piston/cylinder assembly; wherein input elements of the friction clutches are connected to the input shaft; wherein output elements of the friction clutches are each connected to one of the two output shafts; wherein the friction clutches can each be actuated by means of one of the piston/cylinder assemblies; and wherein each piston/cylinder assembly has a piston, which is supported so as to be axially movable in relation to an associated cylinder; wherein each cylinder is supported on a support, in particular in an axial direction, on the side facing away from the piston in a region lying radially outside; and wherein each cylinder is spaced apart from the support on the side facing away from the piston in a region lying radially inside.

In contrast to DE102006010113A1, where the cylinders of the piston/cylinder assemblies are supported on retaining rings in the radially inner regions of the cylinders, such support takes place in radially outer regions of the cylinders in the present dual-clutch assembly. This is advantageous since, while the cylinders in the prior art form second-class levers, with which the reaction forces acting on the cylinders are introduced with torques into the retaining rings in radially inner regions of the cylinders, the cylinders herein do not form such second-class levers, and therefore no torques act on the supports either. Accordingly, the cylinders themselves can be embodied with minimum requirement for materials since the reaction forces are introduced without any torque into the supports.

The support is preferably designed as a ring element, which can be pushed onto a hub.

The radially outer region is preferably arranged radially to the outside of a contact portion of the cylinder, which supports the piston axially in an initial position.

According to certain embodiments, each support is arched away from the associated cylinder along the axial alignment of said support, at least in some region or regions.

This is advantageous since the support is reinforced by the arch to absorb the reaction forces. There is therefore a functional separation in the piston/cylinder assemblies, with which the cylinder is designed for the axial support of the piston while the support is designed specifically to absorb the reaction force. By means of this functional separation, the required installation space is kept to a minimum and the costs for materials are kept low.

It is furthermore preferred that each support should be supported in a radially inner region on a retaining ring, particularly in an axial direction.

Thus, the reaction force is not introduced directly from the cylinder into the retaining ring, as taught in DE102006010113A1; instead, the reaction force flows from the cylinder into the support in radially outer regions and flows from the support into the retaining ring in radially inner regions. By virtue of the fact that the reaction force is introduced into the intermediate support, the cylinder can be designed for the axial support of the piston, while the support is designed specifically to absorb the reaction forces. By virtue of this functional separation, the required installation space is kept to a minimum and the costs for materials are kept low.

According to another embodiment, each cylinder is provided in some region or regions with sealing material in order to tightly surround a piston chamber formed by a piston and the associated cylinder and prevent leaks; and the sealing material of the cylinder is spaced apart from the support.

This has the advantage that sealing material of the cylinder cannot chafe on the support and thus wear.

The object is thus fully achieved.

The features which are mentioned above and those which remain to be explained below can be used not only in the respectively indicated combination but also in other combinations or in isolation without exceeding the scope of the present invention.

BRIEF DESCRIPTION OF THE DRAWINGS

The invention is illustrated by way of example in the figures and explained in greater detail in the description of the figures, in which.

DESCRIPTION OF PREFERRED EMBODIMENTS

Figure 1:
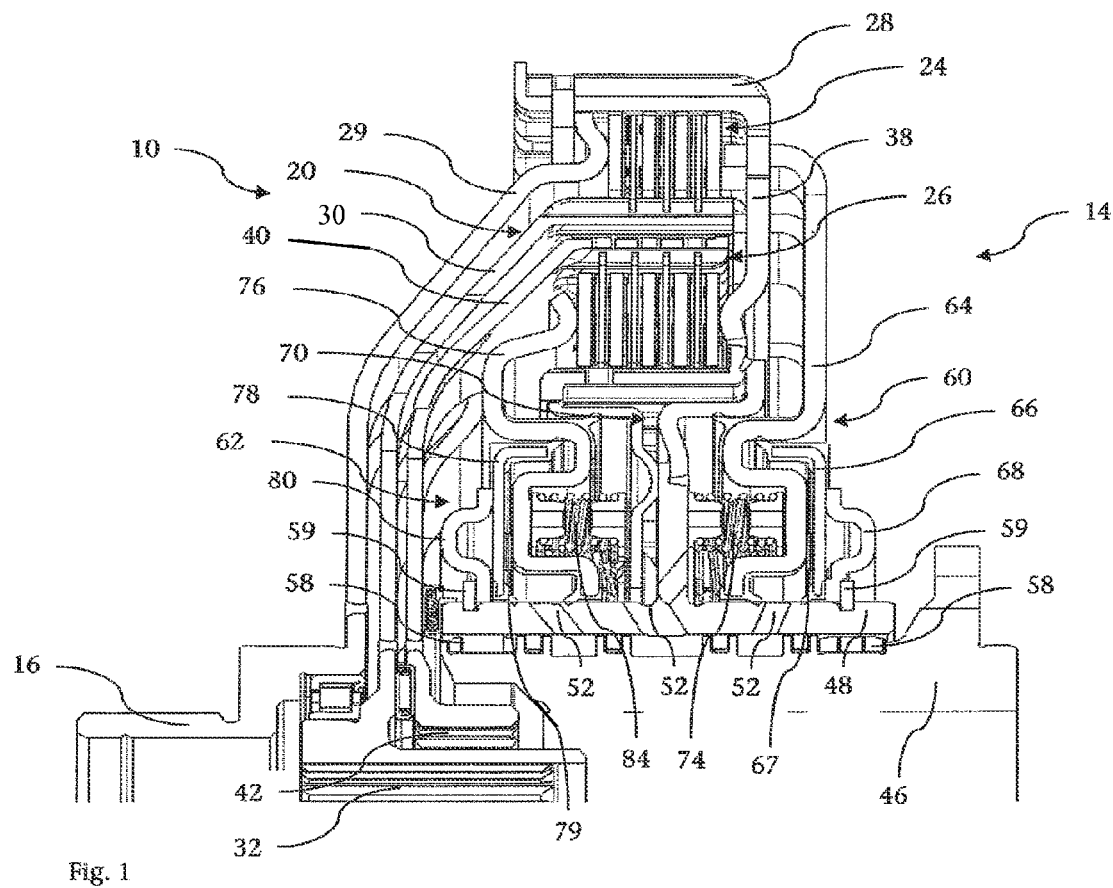
FIG. 1 shows a first embodiment of a dual-clutch assembly.

In the following description of the figures, similar features are provided with the same reference signs. If there are significant differences between individual features, this will be indicated explicitly.

FIGS. 1 to 6 show a drive train 10 having a drive motor (not shown), e.g. an internal combustion engine. The drive train 10 furthermore has a dual-clutch transmission 14, the input shaft 16 of which is connected to a crankshaft of the drive motor. The dual-clutch transmission 14 has a driven shaft (likewise not shown), which can be connected to driven wheels of the motor vehicle in a manner known per se.

The dual-clutch transmission 14 has a dual-clutch assembly 20, which is accommodated in a housing (not shown).

The dual-clutch assembly 20 contains a first friction clutch 24 and a second friction clutch 26. The two friction clutches 24, 26 are arranged so as to be nested radially one inside the other, wherein the first friction clutch 24 is situated radially outside. The relative terms, radially inside and radially outside, are used below in relation to the central axis of symmetry of the dual-clutch assembly 20. This central axis of symmetry corresponds to the axis of the input shaft 16, for example.

The first friction clutch 24 has a first input element 28, which is coupled to the input shaft 16. For this purpose, the first input element 28 is connected for conjoint rotation to a driver plate 29. The driver plate 29, which extends substantially in a radial direction, has a driver ring in an axial direction having internal teeth. With the aid of the internal teeth, the driver plate 29 can be coupled to the input shaft 16, which, for this purpose, has corresponding external teeth.

The first input element 28 extends axially in the manner of a cage. The two friction clutches 24, 26 are arranged radially within the first input element 28.

The first friction clutch 24 furthermore has a first output element 30. The first output element 30 is connected to a first output shaft 32 of the dual-clutch assembly 20. The output shaft 32 is designed as a solid shaft and is connected to a first transmission section of the dual-clutch transmission 14. The first output element 30 is likewise designed in the manner of a cage and extends radially within the first input element 28, wherein the first friction clutch 24 is accommodated in between.

The second friction clutch 26 has a second input element 38, which is coupled to the input shaft 16. The second input element 38 is connected for conjoint rotation to the first input element 28, e.g. by a welded joint. The second friction clutch 26 furthermore has a second output element 40. The second output element is likewise designed in the manner of a cage and extends radially within the first output element 30. The second output element 40 is connected to a second output shaft 42, which is arranged as a hollow shaft concentrically with the first output shaft 32. The second output shaft 42 is connected to a second transmission section of the dual-clutch transmission 14. As mentioned above, the first input element 28, including the driver plate 29, the first output element 30 and the second output element 40 extend in the manner of cages toward the transmission sections or toward the driven shaft, starting from the region of the input shaft 16. On the other hand, the dual-clutch assembly 20 has a hub 46 fixed to the housing, which extends in an axial direction from the region of the transmission section toward the region of the input shaft 16. In the region of the dual-clutch assembly 20, the hub 46 has a substantially cylindrical shape. In this case, the hub 46 fixed to the housing is arranged coaxially with the two output shafts 32, 42 and surrounds them here.

Axial bearings (not denoted specifically) are provided here between an end of the hub 46 fixed to the housing and radial portions of the output elements 30, 40 and a radial portion of the driver plate 29. These axial bearings are aligned in a radial direction with a hub shell 48 mounted rotatably with respect to the hub 46.

The hub shell 48 is of cylindrical design in the region of the dual-clutch assembly 14 and is arranged coaxially with the output shafts 32, 42.

The hub shell 48 can have teeth on its end opposite the driven shaft. These teeth can mesh with corresponding teeth of a hydraulic pump (not shown here) in order to pass fluids required to actuate and/or lubricate the dual-clutch assembly 14 through individual openings 52 in the hub shell 48. The openings 52, of which three are shown in FIGS. 1 to 6 can be drilled or punched, for example. The openings 52 are in fluid communication with a central channel and with circumferentially provided grooves in the hub 46. The fluid is passed through the hub 46 into the dual-clutch assembly 14 through the openings 52.

With the aid of two radial bearings 58, the dual-clutch assembly 14 is supported substantially on the hub 46. Thus, the radial bearings 58 serve to support the input elements 28, 38. In this way, a multiplicity of the elements of the dual-clutch assembly 20 can be held so as to rotate about the hub 46. Although the radial bearing 58 absorbs essentially radial forces, it can also be designed to absorb axial forces. The radial bearings 58 are sealed off, wherein the openings 52 are arranged in a space between the seals. Here, the first input element 28 is likewise connected to the hub shell 48 on its side facing away from the input shaft 16.

To actuate the two friction clutches 24, 26, a first piston/cylinder assembly 60 and a second piston/cylinder assembly 62 are provided. The piston/cylinder assemblies 60, 62 are arranged on mutually opposite sides at an identical radius (relative to the common axis of rotation of the overall system).

The first piston/cylinder assembly 60 has a first piston 64, which is mounted so as to be movable in an axial direction in the first cylinder 66. A piston chamber thereby formed is connected via one of the openings 52 in the hub shell 48 to the central channel within the hub 46 fixed to the housing.

An outer side of the first piston 64 extends radially outward and has axial portions. A radially outer axial portion of the piston 64 is designed to subject the first friction clutch 24 axially to an axial contact pressure force in order to close the friction clutch 24.

The first piston 64 rotates with the first and the second input element 28, 38. The first piston 64 also rotates with the cylinder 66 fixed to the hub shell.

The upper axial portion of the first piston 64, which can impinge upon a plate pack of the first friction clutch 24, extends through an opening (not shown specifically here) in a radial portion of the second input element 38.

A T-shaped rotary member 70 having an inner channel for the supply of fluid is provided on an opposite side from the first piston/cylinder assembly 60. A first spring assembly 74 is provided between the first piston 64 and the rotary member 70 in order to preload the first piston 64 into an open position. For this purpose, the first spring assembly 74 is supported on a radial web of the rotary member 70 and pushes the first piston 64 away from the radial portion in an axial direction, in the direction of the transmission sections in FIGS. 1, 3 and 5. For actuation of the first friction clutch 24, hydraulic fluid is fed to the first piston/cylinder assembly 60, with the result that the first piston 64 is moved in the opposite direction and consequently exerts an axial contact pressure force on the plate pack of the first friction clutch 24.

The second piston/cylinder assembly 62 is constructed in a corresponding manner, preferably from the same components, e.g. as a mirror image thereof. Consequently, the first and the second piston/cylinder assembly 60, 62 can be implemented with similar or identical components, in particular with the same passage opening radius, resulting in a high degree of modularity and little diversity.

The second piston/cylinder assembly 62 accordingly has a second cylinder 78, which is connected for conjoint rotation to the hub shell 46, more specifically substantially adjacent to the second output element 40.

The second piston/cylinder assembly 62 furthermore has a second piston 76. A radial portion of the second piston 76 rests on a plate pack of the second, radially inner friction clutch 26. Consequently, the second piston/cylinder assembly 62 can exert a second axial contact pressure force on the second friction clutch 26, wherein the second axial contact pressure force is aligned opposite to the first axial force.

Figure 3:
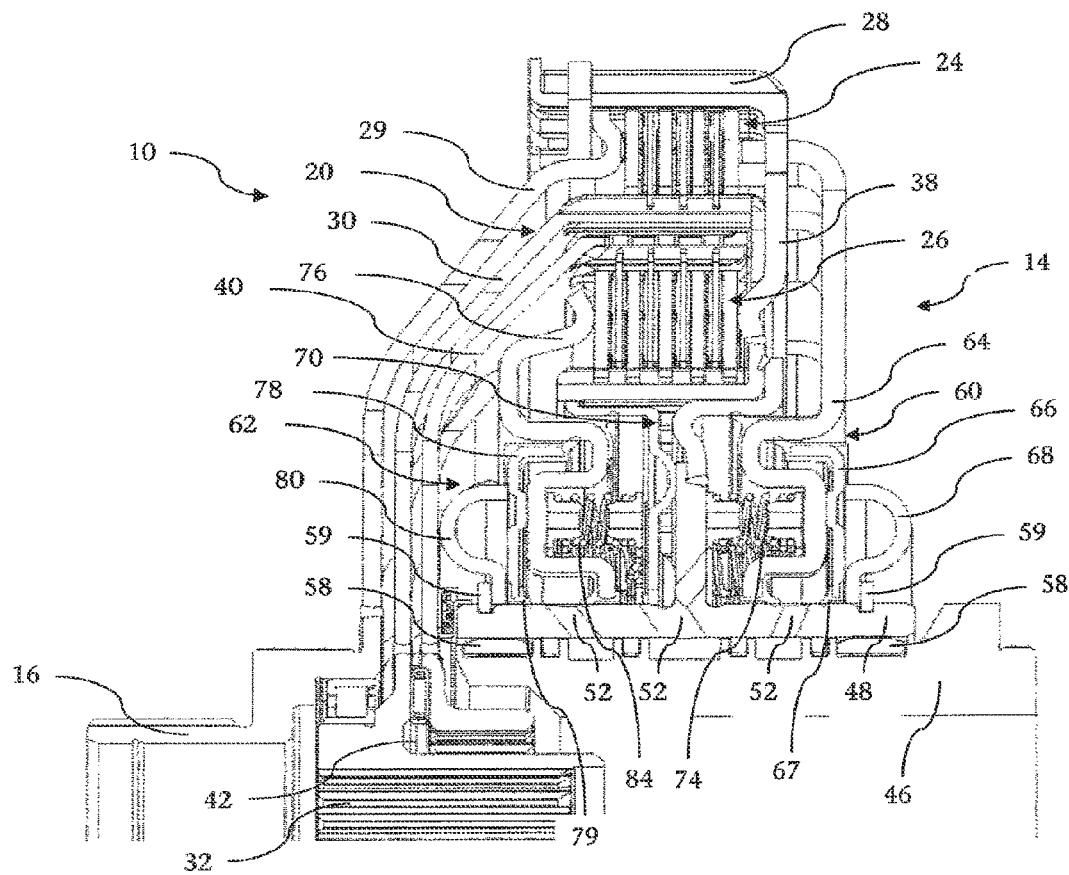
FIG. 3 shows a second embodiment of a dual-clutch assembly.
Figure 5:
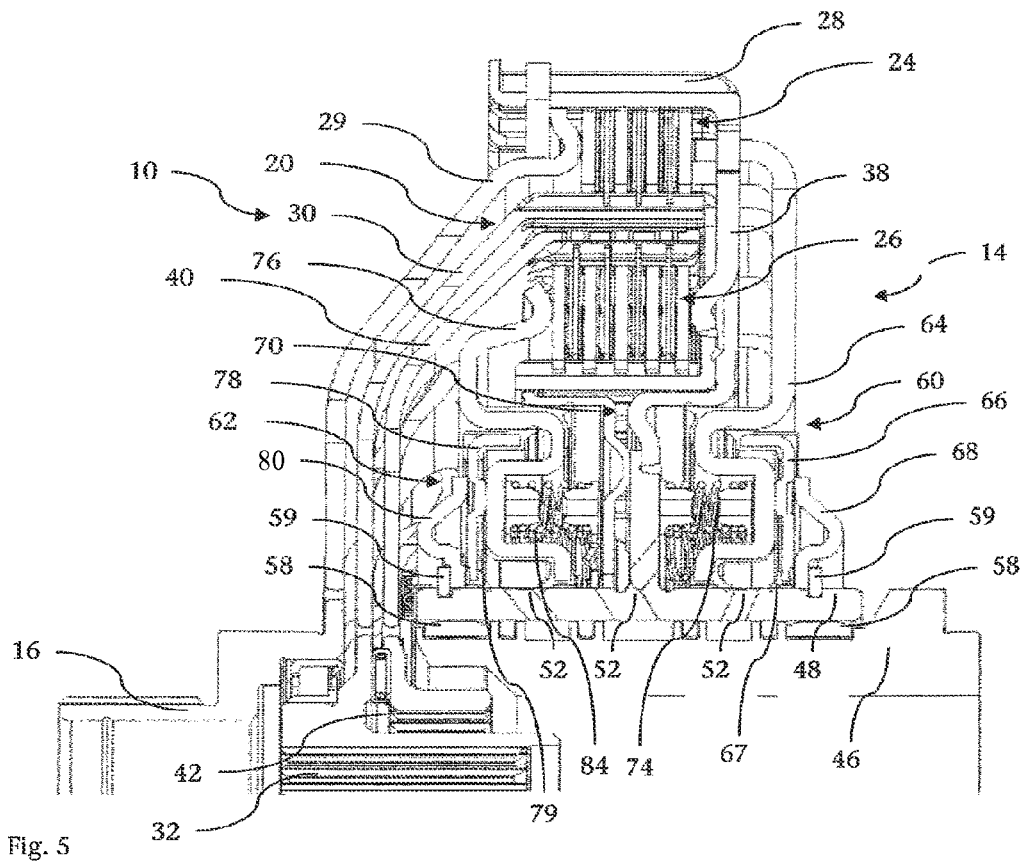
FIG. 5 shows a third embodiment of a dual-clutch assembly.

A second spring assembly 84, which preloads the second piston 76 in the direction of the input shaft 16 in FIGS. 1, 3 and 5, is provided between a further radial portion of the rotary member 70 and the second piston 76 of the second piston/cylinder assembly 62.

The piston chamber of the second piston/cylinder assembly 62 is connected to the central channel in the hub 46 by the opening 52 in the hub shell 48. It is self-evident that a hydraulic circuit (not shown specifically here) also has channels via which cooling fluid can be fed to the friction clutches 24, 26. In this case, the cooling fluid is fed to a chamber in the region of the rotary member 70 and to the radial channels in the rotary member 70 and to the friction clutches 24, 26 via the central channel in the hub 46 fixed to the housing. It is self-evident that suitable radial openings are provided in each of the input and output elements 38, 30, 40 in order to provide suitable flow to the plate packs.

Each cylinder 66, 78 is supported on a support 68, 80 in a radially outer region on the side facing away from the piston 64, 76, while each cylinder 66, 78 is spaced apart from the support 68, 80 in a radially inner region on the side facing away from the piston 64, 76. The support 68, 80 is preferably made from sheet metal with a thickness of several millimeters. The support 68, 80 thus extends from a radially inner region in or to a radially outer region. In relation to the hub shell 48, the radially inner region preferably may have a radial extent of 5 mm to 2 cm. And the radially outer region preferably may have a radial extent of 5 cm to 12 cm in relation to the hub shell 48. As illustrated in detail in FIGS. 2, 4 and 6, the size of a spacing 81 between the pistons 64, 76 and the support 68, 80 in the radially inner region is preferably of the order of 0.05 mm to 0.5 mm. It is also possible to implement larger radial extents of the radially inner region of 3 cm or 5 cm and larger radial extents of the radially outer region of 20 cm or 25 cm. A person skilled in the art can also implement larger spacings of 1 mm or 5 mm. Such larger radial extents or larger spacings require more installation space, however.

According to the preferred embodiments in FIGS. 1, 3 and 5, each support 68, 80 is arched away in its axial orientation from the associated cylinder 66, 76, at least in some region or regions. The support 68, 80 is preferably arched axially away from the associated cylinder 66, 76 in a central region, while the support 68, 80 is aligned radially in the radially inner region and in the radially outer region.

Figure 2:
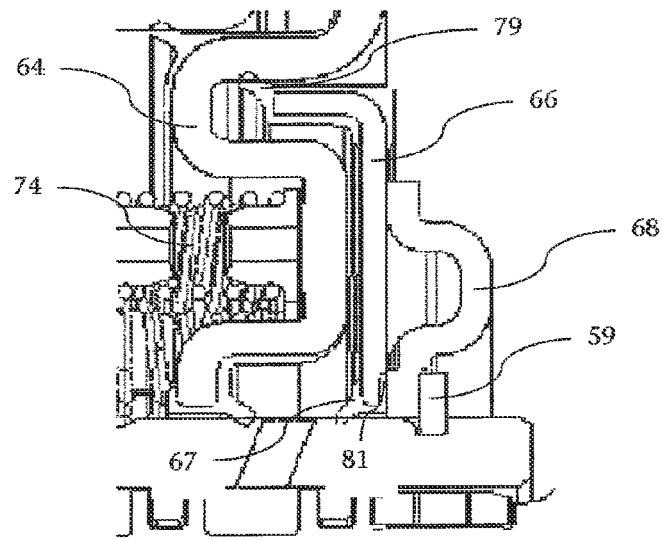
FIG. 2 shows an enlarged detail of FIG. 1.
Figure 4:
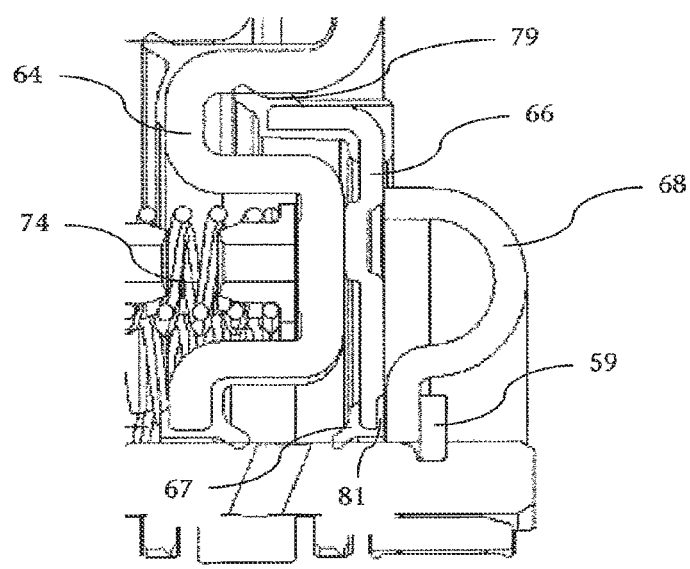
FIG. 4 shows an enlarged detail of FIG. 3.
Figure 6:
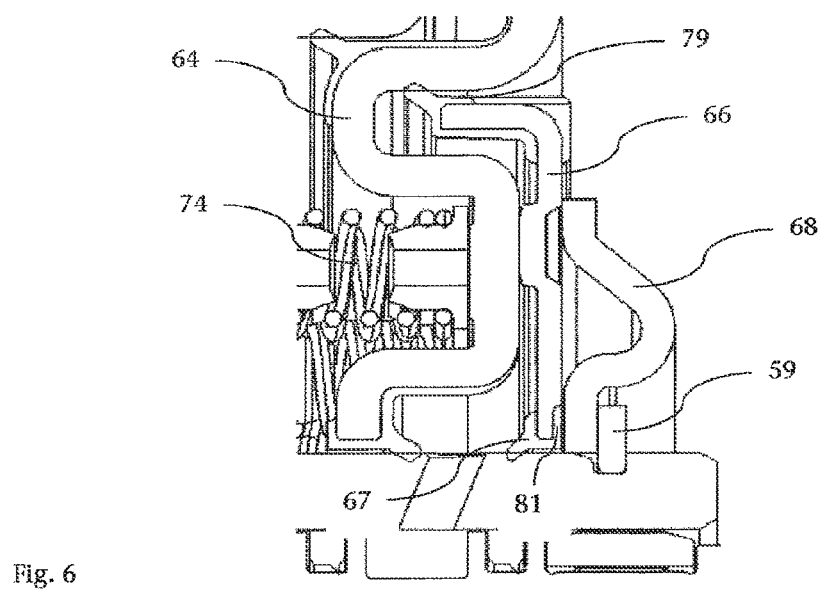
FIG. 6 shows an enlarged detail of FIG. 5.

The arching can be implemented in different ways in terms of production engineering. A semifinished version of the support 68, 80 in the form of a straight sheet is preferably bent. Thus, the first embodiment in FIGS. 1 and 2 shows a support 68, 80 which has a rectangular sheet region in the central region. The second embodiment in FIGS. 3 and 4 shows a support 68, 80 which has a circular sheet region in the central region. The third embodiment in FIGS. 5 and 6 shows a support 68, 80 which has a triangular sheet region in the central region. The central sheet region preferably has one or more straight or bent sheet parts which are connected to one another by folds. The central region of the support 68, 80 is preferably connected to the radially inner region and to the radially outer region by folds. Each of the folds is preferably arranged at a largely constant radial distance.

Each support 68, 80 is preferably supported on a retaining ring 59 in a radially inner region. The retaining ring 59 is arranged on the support 68, 80 on the side facing away from the piston 64, 76. The retaining ring 59 is preferably manufactured from sheet-metal several millimeters thick in the axial direction and 5 mm to 2 cm in length in the radial direction. The retaining ring 59 has largely the radial extent of the radially inner region. The retaining ring 59 is held in a corresponding groove in the hub shell 48. When a piston 64, 76 is pressed into contact, a reaction force thus flows from the associated cylinder 66, 78 into the support 68, 80 in the radially outer region and, from the support 68, 80, the reaction force flows into the retaining ring 59 in the radially inner region. It is also possible to implement retaining rings with greater thicknesses of 1 cm and greater lengths of 3 cm or 5 cm. Here too, it is the case that such greater thicknesses or lengths require more installation space.

As illustrated in the embodiments shown in FIGS. 1 to 6, each cylinder 66, 78 is provided in some region or regions with sealing material 67, 79 in order to pressure and tightly surround a piston chamber formed by a piston 64, 76 and the associated cylinder 66, 78; the sealing material 67, 79 of the cylinder 66, 78 is spaced apart from the support 68, 80. The sealing material 67, 79 is preferably arranged in a radially outer end region of the cylinder 66, 78 and a radially inner end region of the cylinder 66, 78. The sealing material 67, 79 is preferably sprayed onto the end regions of the cylinder 66, 78. While the radially outer end region of the cylinder 66, 78 extends radially outside the support 68, 80 and is thus spaced apart from the support 68, 80, the radially inner end region of the cylinder 66, 78 is spaced apart from the support 68, 80 by the spacing 81 between the pistons 64, 76 and the support 68, 80. A person skilled in the art can will understand, of course, that it is also possible to use annular sealing material such as O-rings, which is contained in corresponding grooves.

While the friction clutches 24, 26 are represented as wet multiplate clutches in FIGS. 1 to 6, it is self-evident that the construction of the dual-clutch assembly 20 according to the invention can also be used for dry friction clutches. In this case, cooling air could be fed in via channels which are used to supply cooling oil in wet clutches, for example.

Overall, it is thus possible to construct a modular system of dual-clutch assemblies which are fitted with wet or dry friction clutches. The basic construction can be used for either variant here.

It is self-evident that the dual-clutch assembly 20 in FIGS. 1 to 6 could also be constructed with piston/cylinder assemblies 60, 62 fixed to the housing. The piston/cylinder assembly 60, 62 would then be mounted directly on the hub 46, in which case additional radial bearings may be necessary in the region of the rotary member 70, as shown in DE102006010113B4, which is expressly incorporated as regards the construction of a dual-clutch assembly with piston/cylinder assemblies fixed for conjoint rotation.

List of reference signs

| 10 | drive train |
| 14 | dual-clutch transmission |
| 16 | input shaft |
| 20 | dual-clutch assembly |
| 24 | first friction clutch |
| 26 | second friction clutch |
| 28 | first input element |
| 29 | driver plate |
| 30 | first output element |
| 32 | first output shaft |
| 38 | second input element |
| 40 | second output element |
| 42 | second output shaft |
| 46 | hub |
| 48 | hub shell |
| 52 | openings |
| 58 | radial bearing |
| 59 | safety ring |

-continued

List of reference signs

| 60 | first piston/cylinder assembly |
| 62 | second piston/cylinder assembly |
| 64 | first piston |
| 66 | first cylinder |
| 67 | sealing material of the first cylinder |
| 68 | first support |
| 70 | rotary member |
| 74 | first spring assembly |
| 76 | second piston |
| 78 | second cylinder |
| 79 | sealing material of the second cylinder |
| 80 | second support |
| 81 | spacing |
| 84 | second spring assembly |

The invention claimed is:

1. A dual-clutch assembly for a dual-clutch transmission having an input shaft, the dual-clutch assembly comprising:
   a first friction clutch having a first input element and a first output element;
   a second friction clutch having a second input element and a second output element;
   a first output shaft;
   a second output shaft;
   a first piston/cylinder assembly; and
   a second piston/cylinder assembly;
   wherein the first and the second input elements of the first and the second friction clutches are connected to the input shaft;
   wherein the first and the second output elements of the first and the second friction clutches are connected to the first and the second output shafts, respectively;
   wherein the first and the second friction clutches can each be actuated by means of one of the first or the second piston/cylinder assemblies;
   wherein each of the first and second piston/cylinder assemblies has a piston, which is supported so as to be axially movable in relation to an associated cylinder;
   wherein each cylinder is supported by a support on a side facing away from the piston in a radially outer region of the support lying radially outside;
   wherein each support is supported by a retaining ring in a radially inner region of the support lying radially inside;
   wherein each cylinder is spaced apart from the support on the side facing away from the piston in the radially inner region; and
   wherein each support is axially arched away from the associated cylinder.

2. The dual-clutch assembly as claimed in claim 1, wherein a spacing between the pistons and the support in the radially inner region of the support is of the order of 0.05 mm to 0.5 mm.

3. The dual-clutch assembly as claimed in claim 1, wherein the support is arched axially away from the associated cylinder in a central region; and wherein the support is aligned radially in the radially inner region and in the radially outer region.

4. The dual-clutch assembly as claimed in claim 1, wherein, in a central region of the support, the support has a sheet region which is rectangular.

5. The dual-clutch assembly as claimed in claim 1, wherein, in a central region of the support, the support has a sheet region which is circular.

6. The dual-clutch assembly as claimed in claim 1, wherein, a central region of the support, the support has a sheet region which is triangular.

7. A dual-clutch assembly for a dual-clutch transmission having an input shaft, the dual-clutch assembly comprising:
   a first friction clutch having a first input element and a first output element;
   a second friction clutch having a second input element and a second output element;
   a first output shaft;
   a second output shaft;
   a first piston/cylinder assembly; and
   a second piston/cylinder assembly;
   wherein the first and the second input elements of the first and the second friction clutches are connected to the input shaft;
   wherein the first and the second output elements of the first and the second friction clutches are connected to the first and the second output shafts, respectively;
   wherein the first and the second friction clutches can each be actuated by means of one of the first or the second piston/cylinder assemblies;
   wherein each of the first and second piston/cylinder assemblies has a piston, which is supported so as to be axially movable in relation to an associated cylinder;
   wherein each cylinder is supported on a support on a side facing away from the piston in a radially outer region lying radially outside;
   wherein each cylinder is spaced apart from the support on the side facing away from the piston in a radially inner region lying radially inside;
   wherein each support is supported in a radially inner region on a retaining ring; and
   wherein the retaining ring is arranged on the side of the support which faces away from the piston.

8. The dual-clutch assembly as claimed in claim 7, wherein, when there is contact pressure from the piston, a reaction force flows from the associated cylinder into the support in the radially outer region; and wherein the reaction force flows from the support into the retaining ring in the radially inner region.

9. The dual-clutch assembly as claimed in claim 1, wherein each cylinder is provided in some region or regions with sealing material in order to tightly surround a piston chamber formed by a piston and the associated cylinder and prevent leaks; and wherein the sealing material of the cylinder is spaced apart from the support.

* * * * *